United States Patent
Kang

(10) Patent No.: US 8,541,957 B2
(45) Date of Patent: Sep. 24, 2013

(54) POWER CONVERTER HAVING A FEEDBACK CIRCUIT FOR CONSTANT LOADS

(75) Inventor: Douglas Kang, San Jose, CA (US)

(73) Assignee: Power Integrations, Inc., San Jose, CA (US)

(*) Notice: Subject to any disclaimer, the term of this patent is extended or adjusted under 35 U.S.C. 154(b) by 284 days.

(21) Appl. No.: 12/853,230

(22) Filed: Aug. 9, 2010

(65) Prior Publication Data

US 2012/0032610 A1 Feb. 9, 2012

(51) Int. Cl.
- *G05F 1/00* (2006.01)
- *H05B 37/02* (2006.01)
- *H05B 39/04* (2006.01)
- *H05B 41/36* (2006.01)
- *H02M 3/335* (2006.01)

(52) U.S. Cl.
USPC .......... 315/307; 315/291; 315/193; 323/282; 363/21.12

(58) Field of Classification Search
USPC .............. 315/307, 278, 291, 301, 302, 306; 323/282
See application file for complete search history.

(56) References Cited

U.S. PATENT DOCUMENTS

| | | | | |
|---|---|---|---|---|
| 5,642,268 A | * | 6/1997 | Pratt et al. | 363/17 |
| 5,872,429 A | * | 2/1999 | Xia et al. | 315/194 |
| 7,262,559 B2 | * | 8/2007 | Tripathi et al. | 315/291 |
| 7,420,335 B2 | * | 9/2008 | Robinson et al. | 315/224 |
| 2010/0026208 A1 | * | 2/2010 | Shteynberg et al. | 315/297 |
| 2010/0033095 A1 | * | 2/2010 | Sadwick | 315/51 |
| 2010/0208500 A1 | * | 8/2010 | Yan et al. | 363/21.12 |
| 2011/0050188 A1 | * | 3/2011 | Wang et al. | 323/282 |
| 2012/0081009 A1 | * | 4/2012 | Shteynberg et al. | 315/122 |

* cited by examiner

*Primary Examiner* — Shawki Ismail
*Assistant Examiner* — Dylan White
(74) *Attorney, Agent, or Firm* — Blakely Sokoloff Taylor & Zafman LLP

(57) ABSTRACT

A power converter having a feedback circuit for constant loads includes an input, a switch, an input voltage sense circuit, a feedback circuit, and a controller. The input is to be coupled to receive an input voltage and the switch is coupled to the input. The input voltage sense circuit is coupled to the input to generate an input voltage sense signal representative of the input voltage. The feedback circuit is coupled to an output of the power converter, where the output is electrically coupled to the input. The feedback circuit generates a feedback signal representative of an output voltage of the power converter. The controller is coupled to the feedback circuit and to the input voltage sense circuit to control switching of the switch to regulate an output current at the output of the power converter in response to the feedback signal and the input voltage sense signal.

16 Claims, 6 Drawing Sheets

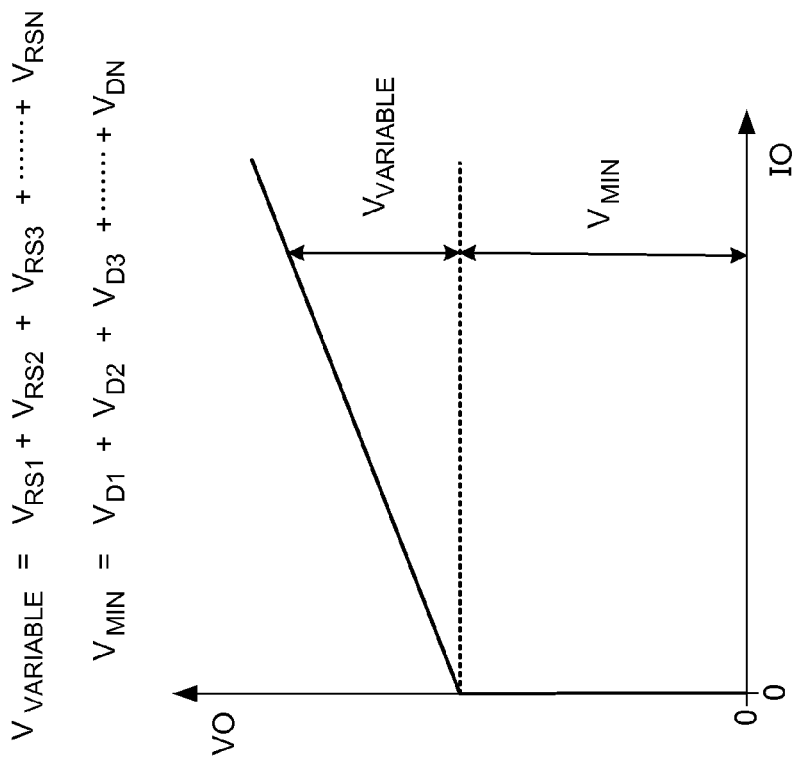
FIG. 2C
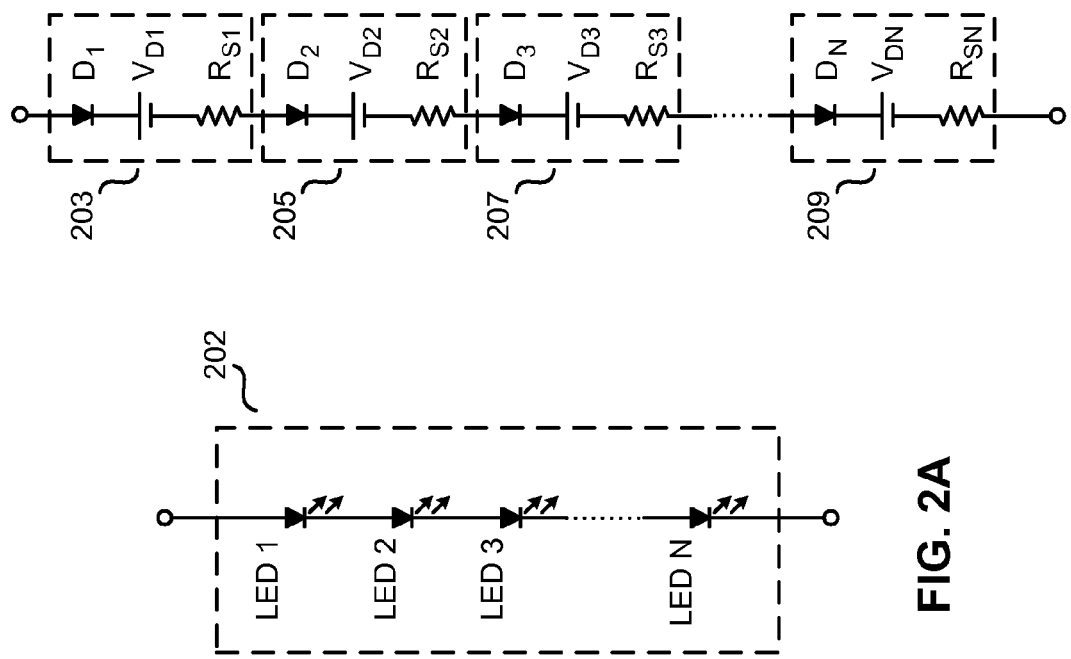
FIG. 2B
FIG. 2A

POWER CONVERTER HAVING A FEEDBACK CIRCUIT FOR CONSTANT LOADS

TECHNICAL FIELD

Embodiments of the present invention relate generally to power converters, and more specifically to power converters for providing power to constant loads.

BACKGROUND INFORMATION

Electronic devices are typically used with power conversion circuits. Switched mode power converters are commonly used due to their high efficiency, small size and low weight to power many of today's electronics. Conventional wall sockets provide a high voltage alternating current. In a switched mode power converter a high voltage alternating current (ac) input is converted to provide a well regulated direct current (dc) output. In operation, a switch, included in the switched mode power converter, is utilized to control the desired output by varying the duty ratio (typically the ratio of the on time of the switch to the total switching period) and/or varying the switching frequency (the number of switching events per unit time). More specifically, a switched mode power converter controller may determine the duty ratio and/or switching frequency of the switch in response to a measured input and a measured output.

Conventional power converters include a controller that may be configured to provide a regulated voltage and/or a regulated current at the output of the power converter. In general, a regulated power converter may also be referred to as a power supply. One type of conventional controller monitors a voltage at the output of the power converter in order to provide a regulated output voltage while another type of controller monitors a current at the output in order to provide a regulated output current. A typical way to measure the output current is to include a sense resistor at the output of the power converter such that the output current flows through the sense resistor and the resultant voltage dropped across the sense resistor is proportional to the output current. However, the voltage dropped across the sense resistor is typically large and often referenced to a voltage level different than that of the power converter controller. Hence, additional circuitry, such as an opto-coupler or a bias winding, is often needed to level shift the voltage across the sense resistor in order to interface with the controller.

BRIEF DESCRIPTION OF THE DRAWINGS

The above and other aspects, features and advantages of several embodiments of the present invention will be more apparent from the following more particular description thereof, presented in conjunction with the following drawings.

FIG. 2A is a diagram illustrating an LED array, in accordance with an embodiment of the present invention.

FIG. 2B is a diagram illustrating a circuit model of LEDs included in the LED array of FIG. 2A.

FIG. 2C is a graph illustrating a relationship between output current and output voltage of the circuit model of LEDs of FIG. 2B.

DETAILED DESCRIPTION

Embodiments of a power converter having a feedback circuit for constant loads are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As mentioned above, conventional controllers typically regulate output current by measuring output current with a sense resistor that results in power being dissipated from the sense resistor, thereby decreasing efficiency and often requiring additional circuitry for level shifting. For some conventional applications, the input of the power converter should be galvanically isolated from the output of the power converter. In general, galvanic isolation prevents dc current from flowing between the input and the output of the power converter. Implementing galvanic isolation, however, usually requires additional circuitry, such as a magnetic coupler or an opto-coupler, which adds cost to the power converter. For embodiments of the present invention, a power converter controller controls switching of a switch to regulate an output current in response to the output voltage. In addition, a power converter, in accordance with embodiments disclosed herein, may be non-isolated and may also include a feedback circuit that directly measures the output voltage without the need for isolation between the output and the controller.

Figure 1:
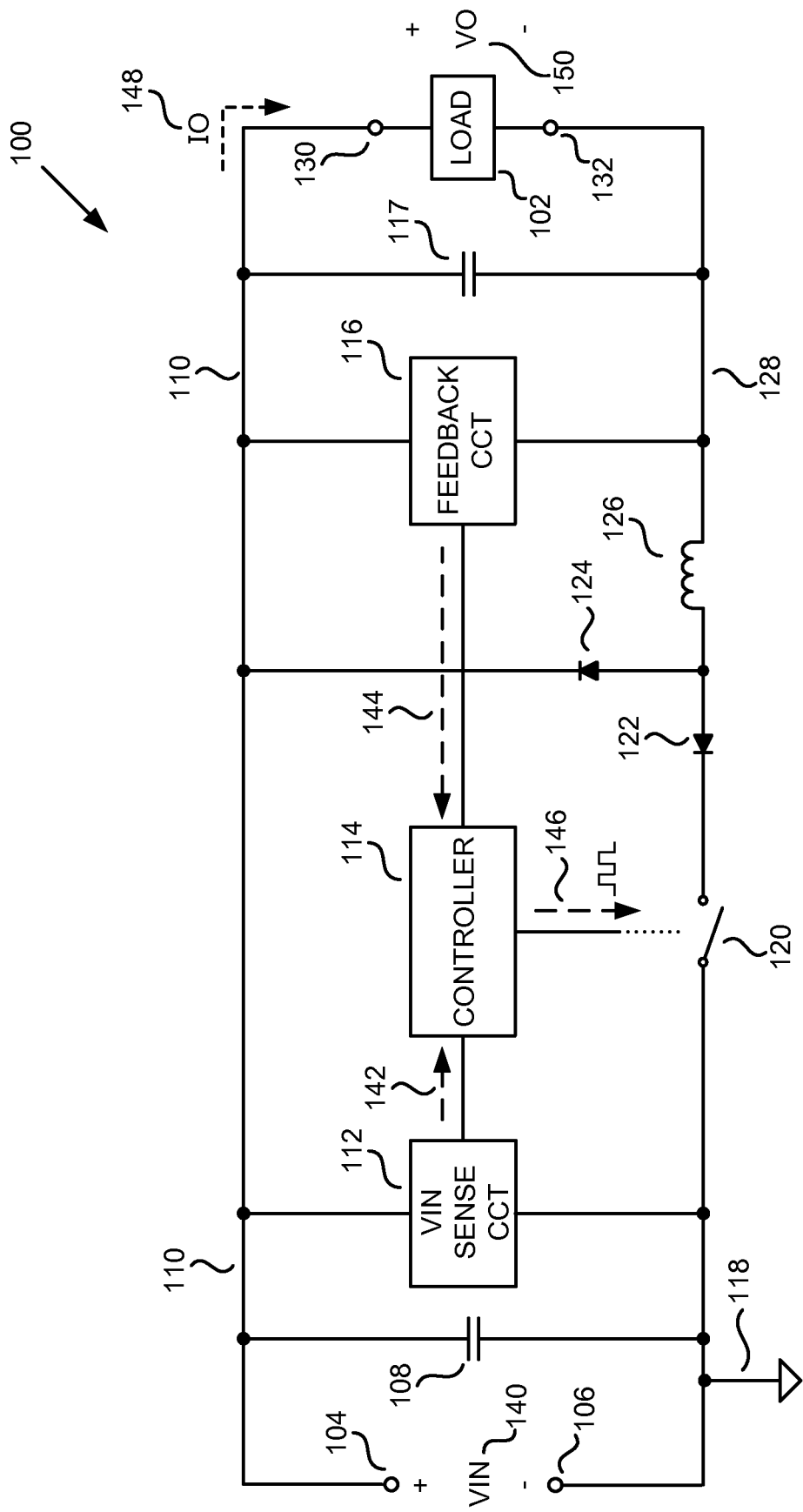
FIG. 1 is a functional block diagram illustrating an example power converter and load, in accordance with an embodiment of the present invention.

FIG. 1 is a functional block diagram illustrating an example power converter 100 and a constant load 102, in accordance with an embodiment of the present invention. The illustrated example of power converter 100 is shown as including input terminals 104 and 106 (collectively referred to herein as the "input" of the power converter), an input capacitor 108, a positive input voltage rail 110, an input voltage sense circuit 112, a controller 114, a feedback circuit 116, an output capacitor 117, an input return 118, a switch 120, diodes 122 and 124, an inductor 126, an output return 128, and output terminals 130 and 132 (collectively referred to herein as the "output" of the power converter). Also shown in FIG. 1 is an input voltage VIN 140, an input voltage sense signal 142, a feedback signal 144, a drive signal 146, an output current IO 148, and an output voltage VO 150.

Power converter 100 is a non-isolated power converter. For example, in the illustrated embodiment, the input of power converter 100 is electrically coupled to the output (e.g., dc current is able to flow between input terminal 104 and output terminal 130). During operation, power converter 100 provides a regulated output current IO 148 to constant load 102 from an unregulated input voltage VIN 140. In one embodiment, the input of power converter 100 receives input voltage VIN 140 from a rectifier circuit (discussed below), which in turn is coupled to receive an unregulated ac input voltage from a source (not shown), such as, a conventional wall socket. As shown in FIG. 1, input terminal 104 is coupled to positive input voltage rail 110, while input terminal 106 is coupled to input return 118.

FIG. 1 further illustrates input capacitor 108 as having one terminal coupled to positive input voltage rail 110 and another terminal coupled to input return 118. As shown in FIG. 1, input capacitor 108 is coupled to receive the input voltage VIN 140. In one embodiment, input capacitor 108 provides a filtering function for noise such as EMI (electromagnetic interference) or other transients. For other applications, the input capacitor 108 may be large enough such that a dc voltage is applied at the input of the power converter 100. However for power converters with power factor correction (PFC), a small input capacitor 108 may be utilized to allow the voltage at the input of the power converter 100 to substantially follow the rectified input voltage VIN 140. As such the value of the input capacitor 108 may be chosen such that the voltage on the input capacitor 108 reaches substantially zero when the rectified input voltage VIN 140 reaches substantially zero.

FIG. 1 further illustrates switch 120 as having one terminal coupled to input return 118 and another terminal coupled to diode 122. Diode 122 is then coupled to diode 124 and inductor 126. However, it should be appreciated that diode 122 may be optional. Diode 122 is coupled to prevent reverse current flow in switch 120. Inductor 126 is further coupled to output return 128, which is coupled to output terminal 132. As shown in FIG. 1, diode 124 is coupled to the positive input voltage rail 110 and inductor 126.

Each of output capacitor 117 and constant load 102 are shown in FIG. 1 as being coupled between positive input voltage rail 110 and output return 128. In operation, output capacitor 117 produces a substantially constant output current IO 148 which is received by constant load 102.

During operation, the constant load 102 may receive substantially constant power. Constant load 102 may also be a load where the output voltage varies as a function of the output current in a predetermined and known manner. For example, output voltage VO 150 may be substantially proportional to output current IO 148. In one embodiment, constant load 102 may be a light emitting diode (LED) array, as will be discussed in further detail below.

Feedback circuit 116 is coupled to sense output voltage VO 150 from the output of power converter 100 and to produce feedback signal 144. Feedback circuit 116 is further coupled to controller 144 such that feedback signal 144 is received by controller 114. Feedback signal 144 may be a voltage signal or a current signal and is representative of output voltage VO 150. It is recognized that a voltage signal and current signal each may contain both a voltage component and a current component. However, the term "voltage signal" as used herein means that the voltage component of the signal is representative of the relevant information. Similarly, the term "current signal" as used herein means that the current component of the signal is representative of the relevant information. By way of example, feedback signal 144 may be a current signal having a voltage component and a current component, where it is the current component that is representative of output voltage VO 150.

As shown in FIG. 1, input voltage sense circuit 112 is coupled to sense the input voltage VIN 140. In one embodiment, input voltage sense circuit 112 detects the peak voltage of input voltage VIN 140. Input voltage sense circuit 112 is also coupled to generate input voltage sense signal 142, which may be representative of the peak voltage of input voltage VIN 140. Input voltage sense signal 142 may be a voltage signal or a current signal and is representative of input voltage VIN 140.

Controller 114 is coupled to generate a drive signal 146 to control the switching of switch 120. Controller 114 may be implemented as a monolithic integrated circuit or may be implemented with discrete electrical components or a combination of discrete and integrated components. In addition, switch 120 receives the drive signal 146 from the controller 114.

Switch 120 is opened and closed in response to drive signal 146. It is generally understood that a switch that is closed may conduct current and is considered on, while a switch that is open cannot substantially conduct current and is considered off. In one embodiment, switch 120 may be a transistor such as a metal-oxide-semiconductor field-effect transistor (MOSFET). In one example, controller 114 and switch 120 form part of an integrated control circuit that is manufactured as either a hybrid or monolithic integrated circuit.

As shown, controller 114 outputs drive signal 146 to control the switching of switch 120 in response to feedback signal 144 and in response to input voltage sense signal 142. In one embodiment, the drive signal 146 is a PWM (pulse width modulated) signal of logic high and logic low sections, with the logic high value corresponding to a closed switch and a logic low corresponding to an open switch. In another embodiment, drive signal 146 is comprised of substantially fixed-length logic high (or ON) pulses and regulates the output by varying the number of ON pulses over a set time period.

In operation, drive signal 146 may have various drive signal operating conditions such as the switch on-time $t_{ON}$ (typically corresponding to a logic high value of the drive signal 146), switch off-time $t_{OFF}$ (typically corresponding to a logic low value of the drive signal 146), switching frequency $f_S$, or duty ratio. As mentioned above, load 102 is a constant load. Thus, during operation, controller 114 may utilize feedback signal 144 and input voltage sense signal 142 to regulate output current IO 148. For example, a reduction in the input voltage sense signal 142 may correspond to the input voltage sense circuit 112 sensing a lower value of the input voltage VIN 140. Thus, controller 114 may extend the duty ratio of drive signal 146 to maintain a constant output current IO 148 in response to this reduction in the input voltage sense signal 142.

In one example, controller 114 may perform power factor correction (PFC), where a switch current (not shown) through switch 120 is controlled to change proportionately with the input voltage VIN 140. By way of example, controller 114 may perform power factor correction by controlling the switching of switch 120 to have a substantially constant duty ratio for a half line cycle of the ac input voltage (not shown). In general, the ac input voltage (not shown) is a sinusoidal waveform and the period of the ac input voltage is referred to as a full line cycle. As such, half the period of the ac input voltage is referred to as a half line cycle. In another example, the controller 114 may perform power factor correction by sensing the switch current and comparing the integral of the switch current to a decreasing linear ramp signal.

As discussed above, constant load 102 may be a substantially constant load that does not vary during operation of the power converter. FIG. 2A illustrates an LED array 202, which is one possible implementation of constant load 102 of FIG. 1. As shown, LED array 202 includes N number of LEDs (i.e., LED 1 though LED N). As further shown, FIG. 2B is a diagram illustrating a circuit model of the LEDs included in the LED array 202 of FIG. 2A. LEDs 203, 205, 207, and 209 are circuit models of LEDs 1, 2, 3, and N, respectively, of FIG. 2A. That is, LED 1 may be represented by the model LED 203 which includes an ideal diode $D_1$, a threshold voltage $V_{D1}$ and a series resistance $R_{S1}$. Thus, LED 203 will generally conduct current when the voltage across LED 203 exceeds threshold voltage $V_{D1}$ and the current through LED 203 will be proportional to the voltage across it due in part to series resistance $R_{S1}$. FIG. 2C is a graph illustrating a relationship between output current and output voltage of the circuit model of LEDs of FIG. 2B. As shown in FIG. 2C, the sum of the threshold voltages $V_{D1}$ through $V_{DN}$ represents a minimum voltage $V_{MIN}$ necessary to turn on the LEDs. That is, LED array 202 will generally not conduct current until the output voltage VO exceeds the minimum voltage $V_{MIN}$. Also, shown in FIG. 2C is that for output voltages VO greater than the minimum voltage $V_{MIN}$, the output current IO is generally proportional to the output voltage VO. In other words, as the output current IO is reduced through LED array 202, a proportional reduction in voltage across the series resistance $R_{S1}$, $R_{S2}$, ... $R_{SN}$ occurs as well, thus, reducing the overall output voltage VO. Thus, controllers in accordance with the embodiments disclosed herein, may utilize the predetermined and known relationship between output voltage VO and output current IO to determine the output current IO by sensing the output voltage VO rather than directly sensing the output current IO. In other words, sensing the output voltage VO may be used to indirectly sense the output current IO. In another embodiment of the present invention, sensing the output voltage VO may be used to indirectly sense a change in the output current IO.

Figure 3:
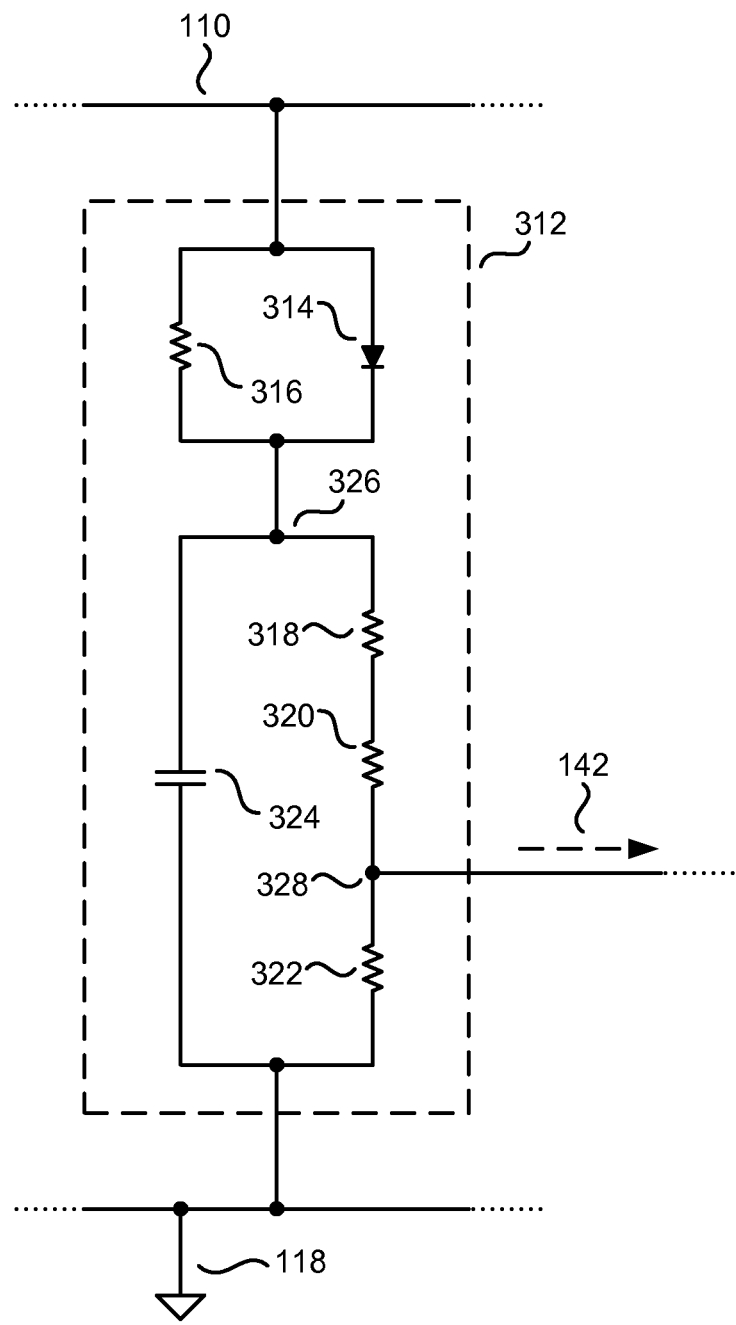
FIG. 3 is a circuit diagram of an example input voltage sense circuit, in accordance with an embodiment of the present invention.

FIG. 3 is a circuit diagram of an example input voltage sense circuit 312, in accordance with an embodiment of the present invention. Input voltage sense circuit 312 is one possible implementation of input voltage sense circuit 112 of FIG. 1. The illustrated example of input voltage sense circuit 312 includes a diode 314, resistors 316, 318, 320, and 322, a capacitor 324, and nodes 326 and 328. Also shown in FIG. 3 are positive input voltage rail 110, input return 118, and input voltage sense signal 142.

In one embodiment, input voltage sense circuit 312 detects the peak voltage of input voltage VIN 140. Input voltage sense circuit 312 is also coupled to generate input voltage sense signal 142, which may be representative of the peak voltage of input voltage VIN 140. Input voltage sense signal 142 may be a voltage signal or a current signal and is representative of input voltage VIN 140.

During operation the voltage between nodes 326 and 328 may be relatively high. Thus, the illustrated example of input voltage sense circuit 312 includes resistors 318 and 320 coupled in series between nodes 326 and 328 such that the voltage rating of each resistor is not exceeded during operation. Although, FIG. 3 illustrates two resistors (i.e., resistors 318 and 320) as coupled between nodes 326 and 328, any number of resistors, including one or more may be utilized such that the voltage rating of each resistor is not exceeded.

Figure 4:
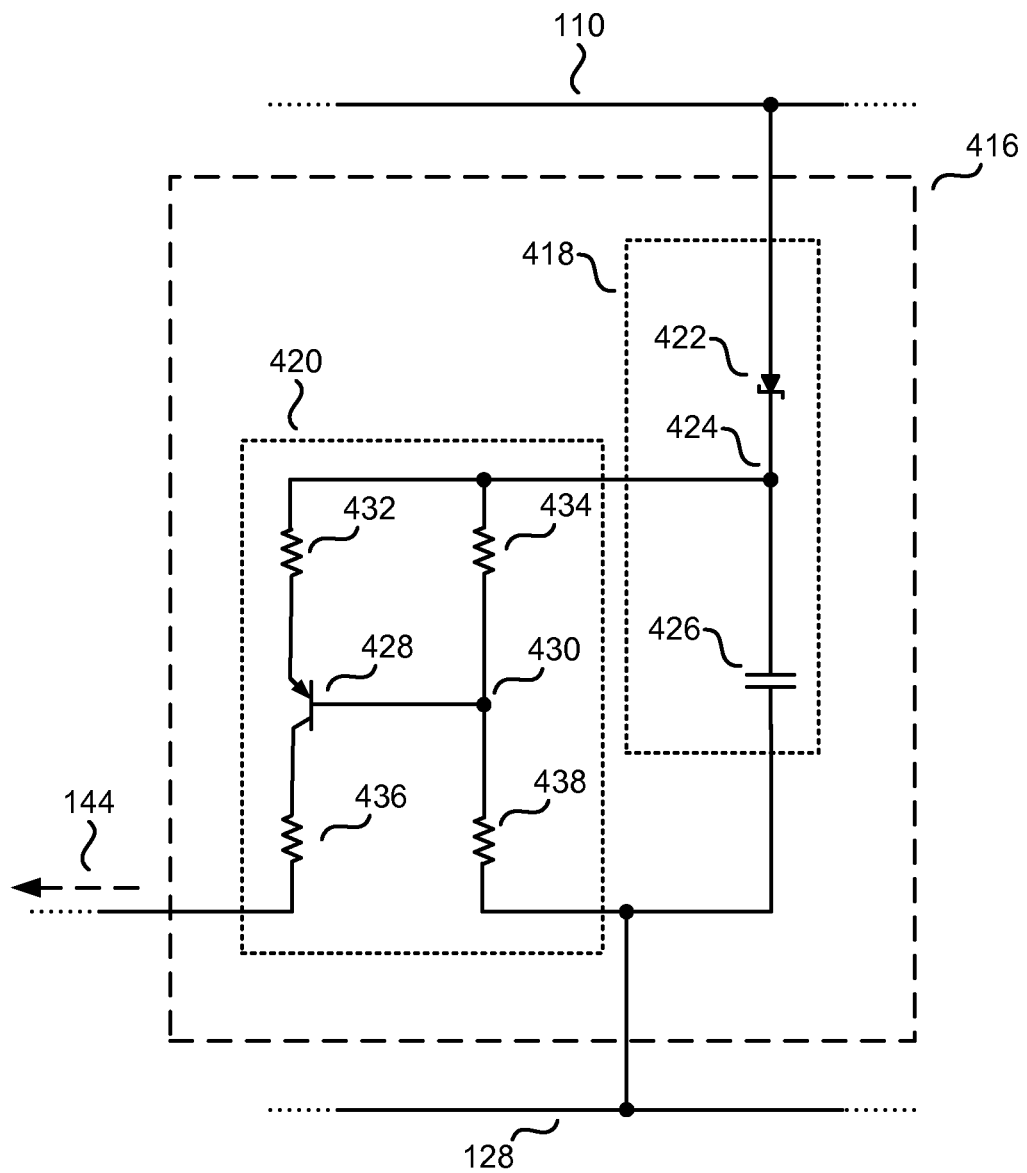
FIG. 4 is a circuit diagram of an example feedback circuit, in accordance with an embodiment of the present invention.

FIG. 4 is a circuit diagram of an example feedback circuit 416, in accordance with an embodiment of the present invention. Feedback circuit 416 is one possible implementation of feedback circuit 116 of FIG. 1. The illustrated example of feedback circuit 416 includes a sense circuit 418 and a voltage-controlled-current-source 420. Sense circuit 418 is illustrated as including a diode 422, a node 424, and a capacitor 426. Voltage-controlled-current-source 420 is illustrated as including a transistor 428, resistor divider (i.e., resistor 434, node 430, and resistor 438), and resistors 432 and 436. Also shown in FIG. 4 are positive input voltage rail 110, output return 128, and feedback signal 144.

Feedback circuit 416 may generate feedback signal 144 that is representative of the output voltage VO 150. Although feedback signal 144 that is generated by feedback circuit 416 is a current signal, it is recognized that feedback circuit 416 may include additional circuitry (not shown) to generate feedback signal 144 as a voltage signal and still be in accordance with the teachings disclosed herein.

Sense circuit 418 is shown in FIG. 4 as being coupled directly to positive input voltage rail 110. In one embodiment, sense circuit 418 is electrically coupled to the input voltage rail 110 without isolation circuitry (e.g., opto-isolator, coupled inductor, transformer, etc.) coupled there between. FIG. 4 further illustrates sense circuit as including diode 422 as having an anode coupled to the output (e.g., via input voltage rail 110) and a cathode coupled to node 424. In one embodiment, diode 422 is a Schottky diode to provide a relatively small forward voltage drop. However, in one embodiment diode 422 may also be a Zener diode. Further shown as included in sense circuit 418 is a capacitor 426. Capacitor 426 is coupled between node 424 and output return 128. The capacitor 426, along with the diode 422, reduces ripple in the output voltage VO 150. As such, the voltage across capacitor 426 is substantially equal to the output voltage VO 150. In other words, voltage at node 424 is substantially equal to the output voltage VO 150. In one embodiment, sense circuit 418 senses the average value of the output voltage VO 150. As such, the voltage at node 424 is substantially equal to the average value of the output voltage VO 150.

Voltage-controlled-current-source 420 is coupled to node 424 to generate feedback signal 144 in response to the voltage at node 424. As discussed above, feedback signal 144 may be a current signal and the voltage at node 424 is substantially equal to the output voltage VO 150. Thus, voltage-controlled-current-source 420 may generate a current signal (e.g., feedback signal 144) that is representative of output voltage VO 150. In one embodiment, feedback signal 144 is proportional to output voltage VO 150.

As shown in FIG. 4, voltage-controlled-current-source 420 includes a resistor divider (i.e., resistors 434 and 438) coupled to provide a reduced voltage at node 430. That is, in the illustrated example the voltage at node 430 is less than the voltage provided at node 424. As shown in FIG. 4, transistor 428 has its control terminal (e.g., base) coupled to node 430. As shown in FIG. 4, transistor 424 may be a PNP bipolar junction transistor coupled to operate in the linear region of the transistor. As such, the feedback signal 144 decreases in response to a decrease in the output voltage VO 150. The feedback signal 144 also increases in response to an increase in the output voltage VO 150. In the illustrated example, the value of resistors 432, 434, 436 and 484 are selected to set the value of feedback signal 144, such that feedback signal 144 is within an operating range of the controller (e.g., controller 114). In one embodiment, the value of resistors 434 and 438 are selected to set the voltage at node 430 lower than the voltage at emitter of transistor 424. Also, in one embodiment, feedback signal 144 is proportional to the output voltage VO 150.

Accordingly, embodiments of the present invention provide for a feedback circuit, such as feedback circuit 416 that provides a feedback signal that is representative of the output voltage VO of the power converter without the need for additional isolation circuitry, as discussed above with conventional systems. As shown in FIGS. 1 and 4, the output of power converter 100 is not electrically isolated from controller 114 by way of feedback circuit 116 or 416. In one embodiment a dc current is allowed to flow from positive input voltage rail 110, through diode 422, through resistor 432, through transistor 428, and on through resistor 436 and output as feedback signal 144 which is then received by controller 114.

Figure 5:
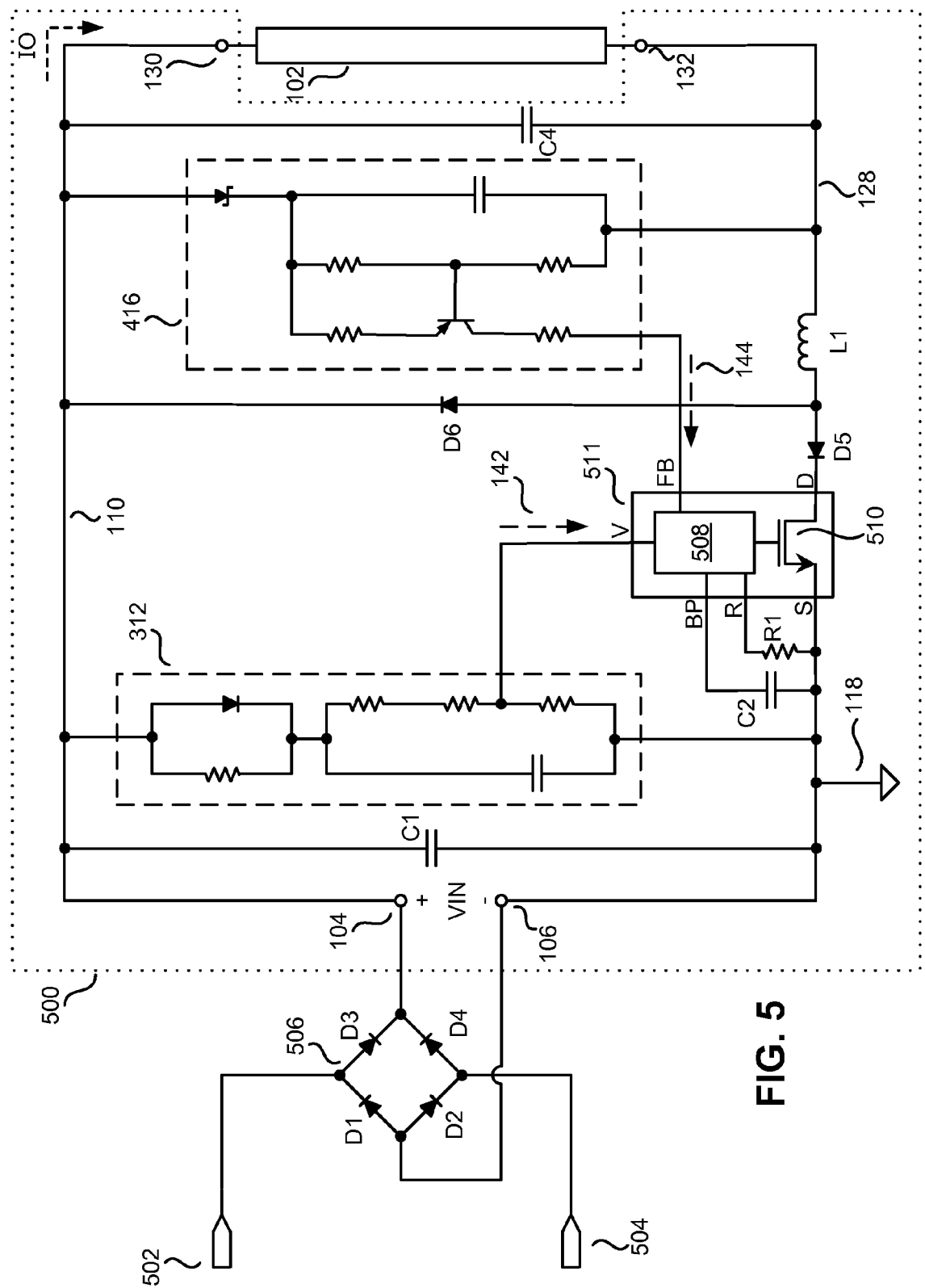
FIG. 5 is a circuit diagram of an example power converter, rectifier circuit, and load, in accordance with an embodiment of the present invention.

FIG. 5 is a circuit diagram of an example power converter 500, rectifier circuit 506, and constant load 102, in accordance with an embodiment of the present invention. Power converter 500 is one possible implementation of power converter 100 of FIG. 1. Also, in one embodiment, constant load 102 is an LED array, such as LED array 202 of FIG. 2A, where power converter 500, rectifier 506, and the LED array are packaged together into a single apparatus, such as an LED lamp (i.e., LED light bulb). The LED lamp including power converter 500, rectifier 506, and LED array 202 may be designed to be interchangeable with and serve as a replacement for conventional incandescent or compact fluorescent light bulbs.

The illustrated example of power converter 500 includes input terminals 104 and 106 (i.e., the input), an input capacitor C1, positive input voltage rail 110, input voltage sense circuit 312, an integrated control circuit 511, feedback circuit 416, an output capacitor C4, input return 118, diodes D5 and D6, an inductor L1, output return 128, and output terminals 130 and 132 (i.e., the "output"). The illustrated example of integrated control circuit 511 includes a controller 508 and a switch 510. Controller 508 and switch 510 are possible implementations of controller 114 and switch 120, respectively, of FIG. 1. Also shown in FIG. 5 are ac input terminals 502 and 504, rectifier circuit 506, input voltage VIN, input voltage sense signal 142, feedback signal 144, and output current IO.

AC input terminals 502 and 504 are to be coupled to a power source, such as a conventional wall socket, to receive an unregulated ac input voltage. Furthermore, rectifier circuit 506 is coupled to receive the unregulated ac input voltage and to provide the input of power converter 500 with a rectified voltage (i.e., input voltage VIN). In one embodiment, rectifier circuit 506 is a full-wave bridge rectifier.

As shown in FIG. 5, integrated control circuit 511 is a low-side controller. That is, the switch 510 is coupled to the input return 118. For the example shown, integrated control circuit 511 has a source terminal S that is coupled to input return 118. Integrated control circuit 511 is shown in FIG. 5 as including other terminals in addition to the source terminal S (i.e., bypass terminal BP, reference terminal R, input voltage terminal V, feedback terminal FB, and drain terminal D, etc.). As shown in FIG. 5, input voltage terminal V is coupled to receive input voltage sense signal 142. As mentioned above, input voltage sense signal 142 may be a current signal. Thus, input voltage terminal V may be configured to sink the current received from input voltage sense circuit 312. Further shown in FIG. 5 is feedback terminal FB coupled to receive feedback signal 144. As also mentioned above, feedback signal 144 may be a current signal and thus, feedback terminal FB may be configured to sink the current received from feedback circuit 416. In one example, reference terminal R is coupled to source terminal S through resistor R1 to provide controller 508 with a reference with which to compare the other signals received by the controller. In one embodiment, the feedback signal 144 and input voltage sense signal 142 may both be referenced with respect to source terminal S.

Although FIG. 5 illustrates switch 510 as including a metal-oxide-semiconductor field-effect transistor (MOSFET), switch 510 may also be a power switching device including a bipolar transistor or an insulated gate bipolar transistor (IGBT).

Figure 6:
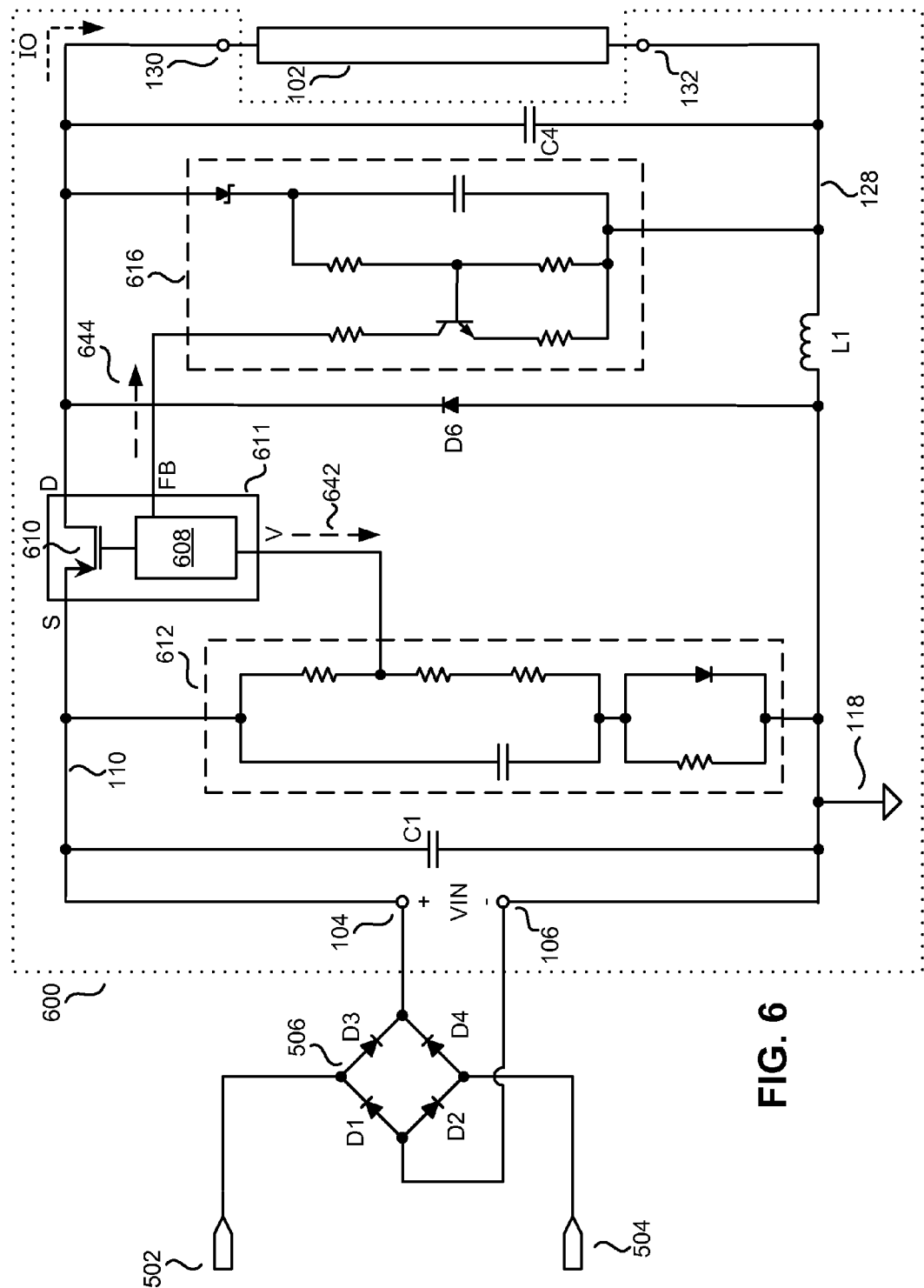
FIG. 6 is a circuit diagram of another example power converter, rectifier, and load, in accordance with an embodiment of the present invention.

FIG. 6 is a circuit diagram of another example power converter 600, rectifier 506, and constant load 102, in accordance with an embodiment of the present invention. In one embodiment, constant load 102 is an LED array, such as LED array 202 of FIG. 2A, where power converter 600, rectifier 506, and the LED array are packaged together into a single apparatus, such as an LED lamp (i.e., LED light bulb). The LED lamp including power converter 600, rectifier 506, and LED array 202 may be designed to be interchangeable with and serve as a replacement for conventional incandescent or compact fluorescent light bulbs.

The illustrated example of power converter 600 includes input terminals 104 and 106 (i.e., the input), an input capacitor C1, positive input voltage rail 110, input voltage sense circuit 612, an integrated control circuit 611, feedback circuit 616, an output capacitor C4, input return 118, diode D6, an inductor L1, output return 128, and output terminals 130 and 132 (i.e., the "output"). The illustrated example of integrated control circuit 611 includes a controller 608 and a switch 610. Also shown in FIG. 6 are input terminals 502 and 504, rectifier circuit 506, input voltage VIN, input voltage sense signal 642, feedback signal 644, and output current IO. Optionally, a diode may be coupled between switch S10 and diode D6. More specifically, an anode of the diode may be coupled to the drain terminal D and the cathode may be coupled to the cathode of diode D6 and the output.

Power converter 600 operates similarly to power converters 100 and 500, discussed above. However, power converter 600 includes integrated control circuit 611 which is implemented as a high-side controller. That is, the switch 610 is coupled to the positive input voltage rail. For the example shown, integrated control circuit 611 has a source terminal S that is coupled to the positive input voltage rail 110. Power converter 600 may still be considered a non-isolated power converter as the input of power converter 600 is electrically coupled to the output (e.g., dc current is able to flow between input terminal 104 and output terminal 130 when switch 610 is conducting).

As shown in FIG. 6, input voltage terminal V is coupled to receive input voltage sense signal 642. As mentioned above, input voltage sense signal may be a current signal. However, because of the high-side implementation of integrated control circuit 611, the input voltage sense signal 642 is flowing out of the input voltage terminal V to input voltage sense circuit 612. Thus, input voltage terminal V may be configured to source the current outputted from input voltage terminal V. Further shown in FIG. 6 is feedback terminal FB coupled to receive feedback signal 144. As also mentioned above, feedback signal 144 may be a current signal and thus, feedback signal 644 is flowing out of the feedback terminal FB to the feedback circuit 616.

Although FIG. 6 illustrates switch 610 as including a metal-oxide-semiconductor field-effect transistor (MOSFET), switch 610 may also be a power switching device including a bipolar transistor or an insulated gate bipolar transistor (IGBT).

While the invention herein disclosed has been described by means of specific embodiments, examples and applications thereof, numerous modifications and variations could be made thereto by those skilled in the art without departing from the scope of the invention set forth in the claims.

What is claimed is:

1. A power converter, comprising:
   an input to be coupled to receive an input voltage;
   a switch coupled to the input;
   an input voltage sense circuit coupled to the input to generate an input voltage sense signal representative of the input voltage;
   a feedback circuit coupled to an output of the power converter, wherein the output is electrically coupled to the input, and wherein the feedback circuit generates a feedback signal representative of an output voltage of the power converter, wherein the feedback signal is a current signal and wherein the feedback circuit includes a voltage-controlled-current-source comprising a transistor coupled to generate the feedback signal in response to the output voltage; and
   a controller coupled to the feedback circuit and to the input voltage sense circuit to control switching of the switch to regulate an output current at the output of the power converter in response to the feedback signal and the input voltage sense signal.

2. The power converter of claim 1, wherein the feedback circuit further includes a sense circuit coupled to the output of the power converter to sense the output voltage and to provide a second voltage substantially equal to the output voltage to the voltage-controlled-current source, wherein the voltage-controlled-current source is coupled to generate the feedback signal in response to the second voltage.

3. The power converter of claim 2, wherein the sense circuit comprises:
   a capacitor coupled to reduce ripple in the second voltage; and
   a diode having an anode coupled to the output of the power converter and a cathode coupled to the capacitor.

4. The power converter of claim 1, wherein the voltage-controlled-current-source includes:
   a resistor divider coupled to generate a reduced voltage in response to the output voltage; and
   wherein the transistor is coupled to generate the feedback signal in response to the reduced voltage.

5. The power converter of claim 1, wherein the switch and the controller are included in an integrated control circuit.

6. The power converter of claim 5, wherein the input voltage sense signal is a current signal, the feedback signal is a current signal, and wherein the integrated control circuit includes:
   a first terminal coupled to receive the input voltage sense signal; and
   a second terminal coupled to receive the feedback signal.

7. An apparatus, comprising:
   an LED array; and
   a power converter coupled to the LED array to provide an output current to the LED array, the power converter including:
      an input to be coupled to receive an input voltage and electrically coupled to the LED array;
      a switch coupled to the input;
      an input voltage sense circuit coupled to the input to generate an input voltage sense signal representative of the input voltage;
      a feedback circuit coupled to the LED array, wherein the feedback circuit generates a feedback signal representative of an output voltage of the power converter, wherein the feedback signal is a current signal and wherein the feedback circuit includes a voltage-controlled-current-source comprising a transistor coupled to generate the feedback signal in response to the output voltage; and
      a controller coupled to the feedback circuit and to the input voltage sense circuit to control switching of the switch to regulate the output current in response to the feedback signal and the input voltage sense signal.

8. The apparatus of claim 7, wherein the feedback circuit further includes a sense circuit coupled to the LED array to sense the output voltage and to provide a second voltage substantially equal to the output voltage to the voltage-controlled-current source, wherein the voltage-controlled-current source is coupled to generate the feedback signal in response to the second voltage.

9. The apparatus of claim 8, wherein the sense circuit comprises:
   a capacitor coupled to reduce ripple in the second voltage; and
   a diode having an anode coupled to the LED array and a cathode coupled to the capacitor.

10. The apparatus of claim 7, wherein the voltage-controlled-current-source includes:
    a resistor divider coupled to generate a reduced voltage in response to the output voltage; and
    wherein the transistor is coupled to generate the feedback signal in response to the reduced voltage.

11. The apparatus of claim 7, wherein the switch and the controller are included in an integrated control circuit.

12. The apparatus of claim 11, wherein the input voltage sense signal is a current signal, the feedback signal is a current signal, and wherein the integrated control circuit includes:
    a first terminal coupled to receive the input voltage sense signal; and
    a second terminal coupled to receive the feedback signal.

13. The apparatus of claim 7, wherein the input voltage is a rectified voltage, and wherein the apparatus further comprises:
    a first input terminal and a second input terminal to be coupled to receive an ac input voltage; and
    a rectifier coupled to receive the ac input voltage and to provide the input of the power converter with the rectified voltage.

14. An apparatus, comprising:
    an LED array; and
    a power converter coupled to the LED array to provide an output current to the LED array, the power converter including:
       an input to be coupled to receive an input voltage and electrically coupled to the LED array;
       a switch coupled to the input;
       an input voltage sense circuit coupled to the input to generate an input voltage sense signal representative of the input voltage;
       a sense circuit coupled to the LED array to sense the output voltage and to provide a second voltage substantially equal to the output voltage;
       a voltage-controlled-current-source coupled to the sense circuit to generate a feedback signal in response to the second voltage, wherein the feedback signal is a current signal representative of the output voltage, and wherein the voltage-controlled-current source includes:
          a first node coupled to generate a reduced voltage in response to the output voltage; and a transistor having a control terminal coupled to the first node, wherein the transistor is coupled to generate the feedback signal in response to the reduced voltage; and a controller coupled to the voltage-controlled-current source and to the input voltage sense circuit to control switching of the switch to regulate the output current in response to the feedback signal and the input voltage sense signal.

15. The apparatus of claim 14, wherein the sense circuit includes:

a second node coupled to provide the second voltage to the voltage-controlled-current source;

a capacitor coupled to the second node to reduce ripple in the second voltage; and a diode having an anode coupled to the LED array and a cathode coupled to the second node.

16. The apparatus of claim 14, wherein the voltage-controlled-current source further includes:

a first resistor having a terminal coupled to the sense circuit and another terminal coupled to the first node; and a second resistor having a terminal coupled to the first node and another terminal coupled to an output return of the power converter.

* * * * *